Aug. 18, 1964     W. HOLZ     3,145,256
OPTICAL SLITS
Filed Nov. 10, 1961
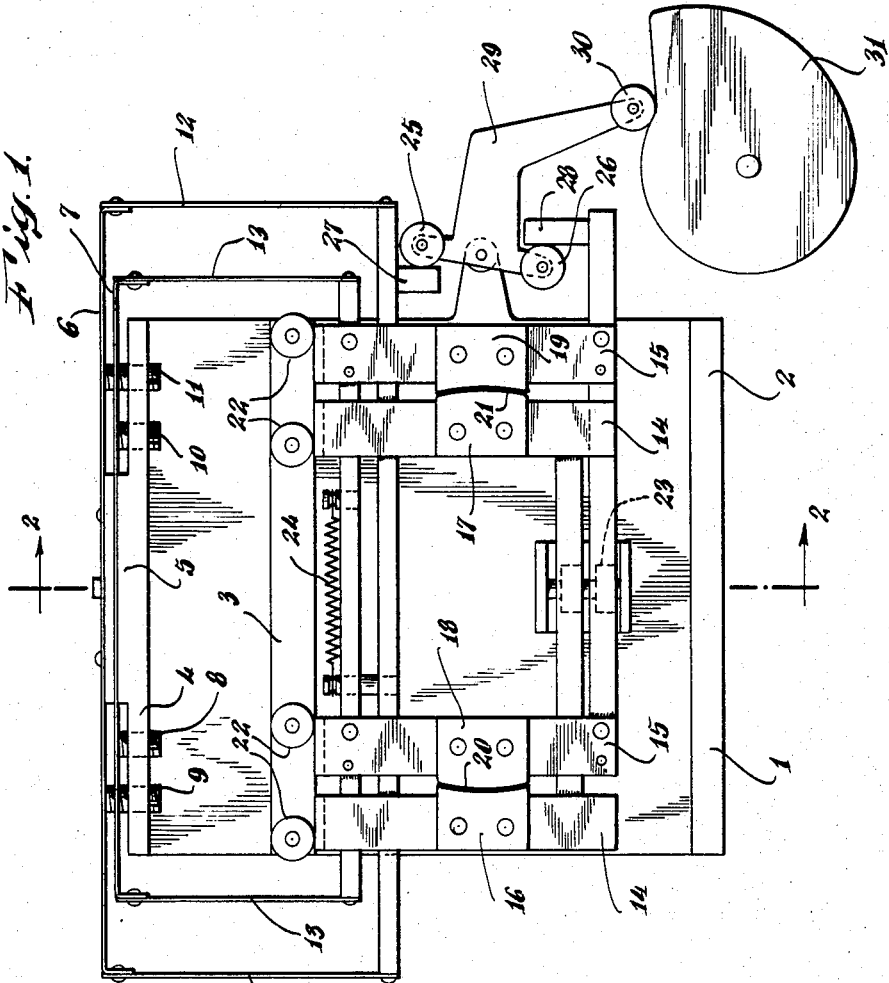
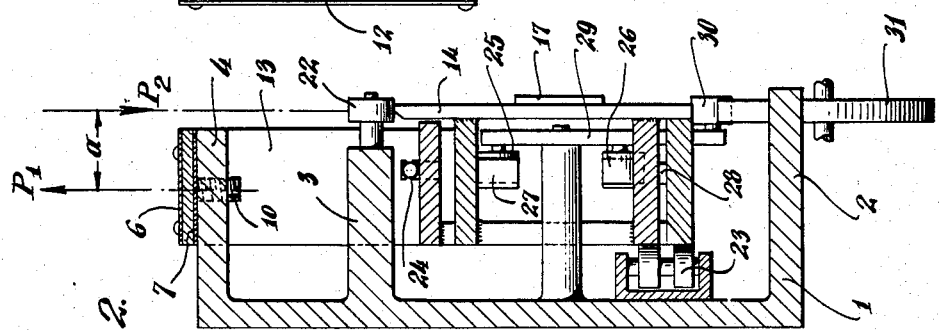
INVENTOR.
Wilhelm Holz
BY Andrew L. Ney
ATTORNEY.

United States Patent Office 3,145,256
Patented Aug. 18, 1964

3,145,256
OPTICAL SLITS
Wilhelm Holz, Uberlingen (Bodensee), Germany, assignor to Bodenseewerk Perkin-Elmer & Co. G.m.b.H., Uberlingen (Bodensee), Germany
Filed Nov. 10, 1961, Ser. No. 151,543
Claims priority, application Germany Nov. 22, 1960
4 Claims. (Cl. 88—61)

This invention relates to improvements in the adjustable slit mechanisms for optical instruments.

In certain prior art optical instruments, the two slit jaw carriers are suspended on pairs of leaf springs in such a manner that they are movable in the slit plane but transversely to the longer dimension of the slit. In many such instruments, the longitudinal axes of the leaf springs are perpendicular to the plane of the slit. Such a design requires a relatively large amount of space. Furthermore, the leaf springs do not provide as exact a movement of the slit jaw carriers as would be desirable. In particular, it is difficult to adjust the movement. A further disadvantage of such prior art arrangements is that the slit jaws describe a circular arc even though their relative orientation is retained. Even though very small angles are dealt with, the resultant shifting of the slit plane may be a disadvantage in highly precise instruments.

Still another disadavntage of many prior art instruments relates to the importance of maintaining the center of gravity of the slit area in a fixed location while varying the slit width. This involves moving both slit-defining jaws in opposite directions by equal amounts. One prior art apparatus accomplishes this result by means of two leaf springs—one secured to each slit jaw. The leaf springs are also secured to opposite sides of a rotatable adjusting member. The disadvantage resulting from this arrangement is the possibility of creating forces in other directions than directly transverse to the slit, thus causing locking and misalignment.

It is, therefore, the primary object of this invention to provide an improved slit jaw mechanism.

Another object is to provide such a mechanism wherein the slit jaws remain on the same plane.

Another object is to provide such a mechanism wherein the movements of the slit jaws are planar.

Another object is to provide such a mechanism requiring a minimum amount of space.

Another object is to restrict the forces on the slit jaws essentially to those in the direction of desired slit jaw movement.

In accordance with this invention, these objects are attained by providing pairs of leaf springs having their longitudinal axes lying substantially in the slit plane or in a plane parallel thereto. The slit jaw carriers are resiliently urged against guide rollers by these springs. In this manner, adjustment of the slit jaw carriers is not effected by the leaf springs but by the easily adjustable guide rollers. By resiliently urging the slit jaw carriers against the guide rollers it becomes possible for the carriers to move through a single plane rather than in an arc—as would be the case if they were rigidly secured to the leaf springs. Furthermore, reliable contact between the slit jaw carriers and the guide rollers is guaranteed. As a further modification of the invention, it has been found expedient to utilize a "double" spring wherein two leaf springs are secured to one another at right angles.

In a further modification of this invention, the leaf springs and the guide roller axes may lie in different parallel planes. The leaf springs then exert a tilting torque on the slit jaw carriers and the slit jaw carriers abut against other guide rollers whose axes lie parallel with the slit axis. By adjusting these guide rollers, the position of the slit plane can be adjusted exactly.

An embodiment of the invention is schematically illustrated in the drawings wherein FIG. 1 is a front elevational view of a slit mechanism constructed in accordance with this invention; and FIG. 2 is a section taken along lines II—II of FIG. 1.

By reference to the illustrations, it will be seen that a frame member 1 carries three projecting parallel bars 2, 3, 4. The upper bar 4 has a thickened central portion 5 which carries two leaf springs 6, 7 positioned so that their ends extend beyond the end of bar 4. Bar 4 additionally has two threaded holes on each side of central portion 5 which contain set screws 8, 9, 10, and 11. Set screws 8 and 10 are positioned against each end of leaf spring 7 while set screws 9 and 11 abut against the ends of spring 6. By turning any of set screws 8, 9, 10, 11, the tension on leaf spring 6 and 7 can be adjusted.

To the extreme ends of leaf spring 7 beyond the set screws, there is mounted another pair of leaf springs 13 which extend vertically downward. Another pair of springs 12 extend vertically downward from leaf spring 6. Leaf springs 12 support one slit jaw carrier 14 of each of a pair of slits 20, 21 while leaf springs 13 support a second slit jaw carrier 15 of each slit. In this illustrated embodiment, the two slits are simultaneously adjusted by the same amounts. Slit jaw carriers 14 and 15 are essentially rectangular frames. To the vertical members of carrier 14, there are positioned slit jaws 16 and 17. To the vertical portions of carrier 15, there are positioned slit jaws 18 and 19. Slit jaw carriers 14 and 15 overlap one another in such a manner that slit jaws 16 and 17 form the left margins of each slit, while slit jaws 18 and 19 form the right margins of the slits. By shifting slit jaw carriers 14 and 15, the slits 20, 21 are varied in size by the same amounts.

The upper portions of slit jaw carriers 14 and 15 abut guide rollers 22 which are positioned on bar 3. The upward forces exerted by leaf springs 6, 7 cause the carriers to be urged against the rollers 22. Leaf springs 6 and 7 also make it possible for slit jaw carriers 14 and 15 to move linearly by bending slightly upwards or downwards as leaf spring pairs 12 and 13 are bent from their normal positions. In this way leaf springs 6 and 7 counteract the otherwise arcuate movement of leaf springs 12 and 13.

As will be seen by reference to FIG. 2, the longitudinal axes of leaf springs 12 and 13 and the contact points of guide rollers 22 lie in planes that are parallel to one another so that the upward force $P_1$ of springs 6 and 7 and the reactive force $P_2$ of rollers 22 create a force couple with a lever arm "$a$," thus producing a tilting torque. Under the influence of this tilting torque slit jaw carriers 14 and 15 abut against guide rollers 23 which are positioned in base frame 1 with their axes vertical and parallel to the longitudinal dimension of the slits.

Guide rollers 22 and 23 may be oriented and aligned by well-known means not illustrated here. By adjusting rollers 22, 23, the position of the slit plane as well as the orientation of the slit jaw carriers may be exactly adjusted.

Slit jaw carriers 14 and 15 are under the influence of a tensioning spring 24 which tends to decrease the slit width. Under the influence of spring 24, shoulders 27, 28 positioned respectively on carriers 14 and 15 abut across rollers 25 and 26 which are positioned on lever arm 29. Lever arm 29 carries a rider 30 which is positioned against a cam 31. For use in a spectrophotometer, cam 31 is rotated in synchronism with the wavelength and changes the slit width in accordance with a given program. As lever 29 is rotated in a counterclockwise direction, roller 25 moves slit jaw carrier 14 to the left against the force of spring 24 and roller 26 moves carrier 15 to the right. In this manner, the slit width is increased. As lever 29 is rotated in a clockwise direction, the slit width is similarly decreased.

It will be apparent that the mechanism of this invention not only has the advantage of great simplicity, but also has the advantage of exerting forces on the slit jaw carriers which are exactly transverse to the longitudinal dimensions of the slits. Furthermore, it will be noted that the center of the slit opening remains always at the same location. This feature is of great importance in spectrophotometry.

A recitation of elements contained in parallel planes in the following claims shall be construed to include said elements in a common plane unless otherwise stated.

It will be apparent to those skilled in this art that the apparatus of this invention is subject to many modifications and variations without departing from the spirit and scope thereof. This invention is to be construed as limited only by the scope of the following claims.

I claim:
1. An adjustable optical slit mechanism comprising:
a base member;
first and second slit defining members;
means coupled to said slit defining members for varying the relative positions of said members to adjust the width of the optical slit defined by said members;
means for guiding the relative movement of said slit defining members in nonarcuate paths;
and first and second leaf spring means depending from said base member in substantially parallel planes which are parallel to the plane of said optical slit for supporting said first and second slit defining members, respectively, and for forcing said first and second slit defining members to abut against said guide means.

2. The apparatus of claim 1 wherein said first leaf spring means includes a first leaf spring fixed to said first slit defining member and a second leaf spring fixed between said first leaf spring and said base and said second leaf spring means includes a third leaf spring fixed to said second slit defining member and a fourth leaf spring fixed between said third leaf spring and said base.

3. The apparatus of claim 2 wherein said second leaf spring is perpendicularly oriented with respect to said first leaf spring and said fourth leaf spring is perpendicularly oriented with respect to said third leaf spring.

4. The apparatus of claim 3 wherein said guide means includes a plurality of rollers mounted on said base member for rotation about axes perpendicular to the plane of said optical slit.

References Cited in the file of this patent
UNITED STATES PATENTS

| | | |
|---|---|---|
| 2,587,451 | Farrand | Feb. 26, 1952 |
| 2,795,170 | Hansen | June 11, 1957 |
| 2,987,958 | Marshall | June 13, 1961 |
| 3,009,390 | Gale | Nov. 21, 1961 |